United States Patent

Vicenzi

[11] Patent Number: 5,851,272
[45] Date of Patent: Dec. 22, 1998

[54] NON-OIL ORGANIC SPRAY WAX COMPOSITIONS

[75] Inventor: Stephen J. Vicenzi, Edgerton, Wis.

[73] Assignee: Vitech International, Inc., Janesville, Wis.

[21] Appl. No.: 799,145

[22] Filed: Feb. 14, 1997

[51] Int. Cl.$^6$ ...................................................... C09G 1/04
[52] U.S. Cl. ............................ 106/11; 106/285; 510/513; 585/3; 585/24
[58] Field of Search ..................... 106/11, 285; 510/513; 585/3, 24

[56] References Cited

U.S. PATENT DOCUMENTS 5,391,325  2/1995  Swenson et al. .

*Primary Examiner*—David Brunsman
*Attorney, Agent, or Firm*—Reinhart, Boerner, Van Deuren, Norris & Rieselbach, s.c.

[57] ABSTRACT

Automobile spray wax compositions incorporating an aromatic compound having at least one of two linear $C_8$–$C_{20}$ alkyl substituents, and a preferred embodiment thereof including a compound identified and characterized by a CAS registry number of 68988-79-4.

27 Claims, No Drawings

NON-OIL ORGANIC SPRAY WAX COMPOSITIONS

BACKGROUND OF INVENTION

This invention is related generally to compositions which enhance the surface tension of water and, more particularly, to automobile spray waxes or rinse/drying aids for use in automatic and self-serve car washes.

In a commercial car wash setting, water is more easily removed by the air jets if it is first beaded or formed into droplets. Many petroleum and fatty materials sprayed onto the wetted surface of an automobile cause water to bead and facilitate subsequent removal. Some of these materials, however, are harmful to a car; others leave windows streaked; and most have no polishing qualities. Also, many of these materials are environmentally undesirable because of toxicity and/or lack of biodegradability.

Most such materials of the prior art are sold in dilute solutions of about 35%–45% active components and applied in a diluted form. Preferable dilutions for application to an automobile surface are in the range of 0.25% to 2%. A typical spray wax or drying aid contains a hydrophobe such as mineral seal oil, an emulsifier such as a quaternary ammonium salt, ethoxylated amines or nonionic surfactants, a glycol ether coupling solvent and water. One indication of the success of these drying or rinse aids is the size of the water beads formed. The larger the beads, the more efficiently the water can be blown from the car surface at the end of the washing process. Such mineral seal oil compositions of the prior art perform capably through such beading action to decrease drying time.

However, there is a trend to use "oil-free" formulations, in that mineral seal oil is one of the aforementioned materials having undesirable biodegradation and toxicity profiles. Change has been slow because mineral seal oil is relatively inexpensive and formulators have been unable to find a replacement offering the same cost parameters. In addition, most replacements considered do not provide the level of performance (e.g., water beading) required.

SUMMARY OF THE INVENTION

There are a considerable number of problems and efficiencies associated with automobile spray wax compositions, as previously formulated using mineral seal oil and related hydrophobic materials. There is a demonstrated need for materials and/or compositions providing comparable performance, but without environmental concerns or an increase in cost.

Accordingly, it is an object of the present invention to provide various hydrophobic components and/or compositions, which can be used as or with automobile spray waxes, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all instances, to every aspect of the present invention. As such, the following objects can be viewed in the alternative with respect to any one aspect of the present invention.

It can also be an object of the present invention to provide an aromatic and/or hydrocarbon compound or mixtures of compounds consistent with those described herein, and/or which can be used with an automobile spray wax composition or the active part thereof.

It can also be an object of the present invention to provide a replacement for mineral seal oil exhibiting among other attributes consistent chemical and/or performance parameters from one batch to another.

It can also be an object of the present invention to provide such compounds or mixtures, meeting the physical, chemical and/or performance characteristics described herein, either by way of synthetic routes or procedures well known to those skilled in the art, or alternatively through the surprising and unexpected utilization of heavy alkylates isolated as one or more side streams from the fractional distillation of various linear alkylbenzenes.

Other objects, features and advantages of the present invention will be apparent in this summary and descriptions of preferred embodiments, and will be readily apparent to those skilled in the art having knowledge of various synthetic methods and/or the formulation of compositions of the sort which can be used as automobile spray waxes. Such objects, features, benefits and advantages will be apparent from the above as taken in conjunction with the accompanying examples, tables, data, and all reasonable inferences to be drawn therefrom.

The aromatic/hydrocarbon of this invention can have one or two linear $C_{10}$–$C_{20}$ alkyl substituents or a mixture of such compounds. Representatives of such compounds are provided in several examples below. In particular, preferred embodiments which are useful with the inventive spray wax compositions are such para-disubstituted benzenes or toluenes, more particularly, those compounds having $C_{10}$–$C_{14}$ alkyl substituents.

The compounds described above can include aromatic hydrocarbons identified by a CAS registry number of 68988-79-4. As is well known to those skilled in the art, Chemical Abstracts Service (CAS) registry numbers are unique numerical identifiers assigned to chemical substances recorded in the CAS chemical registry system. This system uniquely identifies a chemical substance on the basis of unambiguous computer-language description of its molecular structure, including all stereochemical detail. All such specific substances are indexed in Chemical Abstracts (CA). Each registry number is a concise and unique means of substance identification which is dependent of, and therefore bridges, the many systems of chemical nomenclatures.

Chemical substances having a CAS registry number of 68988-79-4 include heavy alkylates isolated as one or more side streams from the fractional distillation of linear alkylbenzenes, prepared enroute to a variety of sulfonate detergents. Typically, paraffins are converted to olefins, which are then used under catalytic conditions to alkylate benzene, toluene and other suitable aromatic starting materials. The heavy alkylates so prepared/isolated, otherwise referred to as fractionation bottoms, distillation residues, and/or distillation bottom ends/high boilers, are sufficiently characterized and identifiable through knowledge of the starting paraffin and aromatic materials and associated reaction conditions. For instance, those heavy alkylates having a CAS registry number of 68988-79-4 are predominately para-substituted dialkylbenzenes. The length of the alkyl chains is predictable based on the starting paraffin materials and the alkylation process used. Most alkyl substituents are linear; however, short branching (methyl) may be observed as a result of known molecular rearrangement processes. Invariably, such dialkylbenzenes are isolated in the presence of corresponding linear alkylbenzenes.

Nevertheless, the aromatics, hydrocarbons and/or heavy alkylates of the present invention can suitably comprise, consist of, or consist essentially of one or more molecular compounds. Each such aromatic, hydrocarbon and/or heavy alkylate is distinguishable, characteristically contrasted, and can be practiced in conjunction with the present invention separate and apart from another. Accordingly, it should be understood that the inventive compositions and/or methods, as illustratively disclosed herein, can be prepared and/or practiced in the absence of any one molecular compound, component, species and/or step which may or may not be specifically disclosed, referenced or inferred herein, the absence of which may or may not be specifically disclosed, referenced or inferred herein.

The emulsifier component of a spray wax composition is responsible for plating the hydrophobe onto the auto surface. Such emulsifers can be quaternary ammonium salts, ethoxylated amines or anionic or nonionic surfactants. The emulsifier component can be one emulsifier or a blend of various emulsifiers. More specifically the emulsifier can be chosen without limitation, from one or more of the following: dicoco dimethyl ammonium chloride, ditallow dimethyl ammonium chloride, ether amine quaternaries such as: isodecyloxypropyl, bis-2-hydroxyethyl methyl ammonium chloride, isotridecyloxypropyl dihydroxyethyl methyl ammonium chloride, and fatty amine salts, imidazolines (oleyl, coco, tall oil and lauric, etc.), and salts thereof, imidoamine salts, ester-based quaternary salts, and amido and diamido amine quaternary salts. Preferably, at least one of the emulsifiers should be cationic if a blend is used.

A strong solvent is typically used to aid coupling or the compatibility of the hydrocarbon component with water. Such a solvent also prevents thickening and gelation when the emulsion is diluted with water. Suitable solvents include glycol ethers, such as ethylene glycol monobutyl ether, and amine oxides, as well as other such coupling agents/solubilizers known to those skilled in the art.

As mentioned above, the present invention permits formulators of automobile spray wax compositions to prepare oil-free materials and improve performance without increased costs--as compared to mineral seal oils of the prior art. The same or comparable performance parameters are observed with lower active product levels. For example, if a mineral seal oil composition is prepared using a 40% active spray wax, the same performance can be achieved using this invention with about a 30–32% active spray wax level. In general, and as provided in more detail below, about 20% less active spray wax material is required to achieve the same degree of performance.

In addition, the aromatics, hydrocarbons and/or heavy alkylates of this invention are odorless, in comparison with mineral seal oils and various other fatty or petroleum materials of the prior art. This advantage permits the incorporation of fragrance components at lower levels, resulting in lower costs and reduced formulation difficulties. For instance, due to the negative odor component of mineral seal oil and many other replacements, higher levels of fragrance have been required to achieve the desired scent. However, high levels of a fragrance component can lead to an undesired modification of the hydrophilic lipophilic balance (HLB) of the composition and lead to formulation and instability. Adjustment of the balance can lead to loss of performance.

Another advantage relates to the chemistry underlying the present aromatics, hydrocarbons and/or heavy alkylates. Controlled synthetic routes provide, from one batch to another, compounds or mixtures thereof with predictable chemical profiles and consistent performance. Unpredictable variables in the preparation of mineral seal oil often leads to batch to batch inconsistencies and formulation difficulties. For instance, a variation in oil composition can adversely affect the HLB, necessitating pre-testing of a laboratory sample with each new batch. No such manipulation is required with this invention. Adherence to tight chemical and physical specifications assures consistent batch to batch performance.

Without limiting the benefits and advantages of this invention, it will be also noted that the aromatics, hydrocarbons and/or heavy alkylates of this invention, when incorporated into a spray wax, are observed to improve the durability of such compositions and the gloss imparted thereby. Increased durability has been observed over time, through multiple split hood testing and as observed in comparison with formulations using a higher active level of mineral seal oil.

EXAMPLES OF THE INVENTION

The following non-limiting examples and data illustrate various aspects and features relating to the compositions and methods of this invention, including the surprising and unexpected utility of the aromatic hydrocarbons and/or heavy alkylates: in particular, low toxicity and excellent biodegradability and the use thereof at concentrations lower than what would otherwise be expected. Comparable utility and advantages can be realized using various other embodiments, consistent with this invention.

Example 1

The aromatic/hydrocarbon component of the present invention can be characterized according to the following properties, standards, standardized tests and/or specifications. The properties and specifications will vary within acceptable and predictable ranges depending upon alkyl substitution and molecular weight. Accordingly, comparable properties and specifications can be observed with such components and the alkyl substituent(s) as disclosed herein. The specifications of this example correspond to a preferred hydrocarbon component, with a molecular composition consistent with a mixture of the compounds of Examples 2(a)–(c). Such a mixture and other such compounds/mixtures are available from Vitech International Inc. of Janesville, Wis.

| Properties | Test | Specifications |
|---|---|---|
| Density | ASTM-4052-95 | 0.855–0.870 |
| Bromine number | ASTM-1159-93 | 2 max. |
| Gardner color | ASTM-D-156-94 | 4 max. |
| Water | UOP-481-80 | 50 max. |
| Viscosity (104° F.) | ASTM-D-445-94 | 12–22 |
| Viscosity (122° F.) | ASTM D-44-5-94 | 7–15 |
| Flash point | ASTM-D-93-94 | 170 min. |
| Aniline point | ASTM-D-611-92 | 60 min. |

Example 2

The heavy alkylate mixture of this example is a preferred embodiment of the inventive aromatic component. Isolated as one or more by-products of a chemical process such as that described above, this mixture is about 14 to about 16 weight percent of a linear monoalkyl ($C_8$–$C_{14}$) benzene, with the remainder comprising dialkyl ($R_1$ and $R_2$) benzenes having a molecular weight between 344 and 456, corresponding to a series of homologous ($CH_2$) alkyl substituents with a predominantly para-substitution pattern (e.g., MW=344 with alkyl substituents of $C_8$, $C_9$, $C_{10}$ and/or $C_{11}$ such that $R_1+R_2=C_{19}$; and MW=456 with alkyl substituents of $C_{13}$ and $C_{14}$ such that $R_1+R_2=C_{27}$).

Examples 2a–2c illustrate three representative mixtures of heavy alkylates, each of which is commercially available and the by-product of a particular chemical process of the sort described herein. Each heavy alkylate mixture is an aromatic/hydrocarbon component and can be utilized with the present invention alone or in combination with one or more others. A preferred embodiment is a combination of the three mixtures (Examples 2a–2c) and is available from Vitech International Inc.

Example 2a 14.5 wt. percent linear alkyl($C_{10}$–$C_{14}$)benzene and 77.3 wt. percent dialkylbenzene: MW=386 ($R_1$ and $R_2=C_{10}$, $C_{10}$, $C_{11}$ and/or $C_{12}$; $R_1+R_2=C_{22}$)–428 ($R_1$ and $R_2=C_{11}$, $C_{12}$, $C_{13}$ and/or $C_{14}$; $R_1+R_2=C_{25}$); ave. MW=376.

Example 2b 15.5 wt. percent linear alkyl ($C_{10}$–$C_{14}$) benzene and 68.7 wt. percent dialkylbenzene: MW=386 ($R_1$ and $R_2=C_{10}$, $C_{11}$ and or $C_{14}$; $R_1+R_2=C_{25}$); ave. MW=386.

Example 2c 14.4 wt. percent linear alkyl ($C_{10}$–$C_{14}$) benzene, 23.1 wt. percent dialkylbenzene: MW=386 ($R_1$ and $R_2=C_{10}$, $C_{11}$ and/or $C_{12}$, $R_1+R_2=C_{22}$)–428 ($R_1$ and $R_2=C_{11}$, $C_{12}$, $C_{13}$ and or $C_{14}$; $R_1+R_2=C_{25}$), and 59.0 wt. percent dialkylbenzene: MW=442 ($R_1$ and $R_2=C_{12}$, $C_{13}$ and/or $C_{14}$; $R_1+R_2=C_{26}$)–456 ($R_1$ and $R_2=C_{13}$ and $C_{14}$; $R_1+R_2=C_{27}$); ave. MW=410.

Example 3

A combination of the mixtures of examples 2a–2c provides, alone or in comparison with mineral seal oil, an excellent ecological/toxicological profile, as shown below. Comparable profiles are available through useful other such components of this invention, as well as with inventive compositions incorporating those compounds.

| Toxicological | |
|---|---|
| Oral | (Rat LD 50: >15,800 mg/kg) |
| Dermal | (Rabbit LD 50: >7,940 mg/kg) |
| Inhalation | (Rat-6hr LC 50: >0.9 mg/l)* |
| Eye Irritation | (Rabbit, 24hr: 4.01/110.0) |
| Ecological | |
| 96-HR LC50: Fathead Minnow | >1,000 mg/l |
| 96-HR LC50: Bluegill | >100 mg/l |
| 96-HR LC50: Rainbow Trout | >100 mg/l |

Biodegradation:

Oxygen uptake data indicates that this (product) may be classified as biodegradable according to a modified version of the CFR 40 method and a SCAS test.

*(highest atmospheric concentration achievable in this study)

Example 4

The aromatic/hydrocarbon components of this invention include the following, as represented by structures I (a–c).

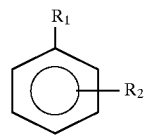

| | $R_1$ | $R_2$ |
|---|---|---|
| (a) | H | p- or o-$C_nH_{2n+1}$ (n = 8–20) |
| (b) | $CH_3$ | p or o-$C_nH_{2n+1}$ (n = 8–20) |
| (c) | $C_nH_{2n+1}$ | p or o-$C_nH_{2n+1}$ (n = 8–20) |

With reference to structures I(c) in example 4, preferred embodiments of such an aromatic component include the following compounds.

| | $R_1$ | $R_2$ |
|---|---|---|
| (1) | $C_{10}H_{21}$ | p-$C_9H_{19}$ |
| (2) | $C_{11}H_{23}$ | p-$C_8H_{17}$ |
| (3) | $C_{10}H_{21}$ | p-$C_{10}H_{21}$ |
| (4) | $C_{10}H_{21}$ | p-$C_{11}H_{23}$ |
| (5) | $C_{11}H_{23}$ | p-$C_{11}H_{23}$ |
| (6) | $C_{12}H_{25}$ | p-$C_{10}H_{21}$ |
| (7) | $C_{11}H_{23}$ | p-$C_{12}H_{25}$ |
| (8) | $C_{13}H_{27}$ | p-$C_{10}H_{21}$ |
| (9) | $C_{12}H_{25}$ | p-$C_{12}H_{25}$ |
| (10) | $C_{13}H_{27}$ | p-$C_{11}H_{23}$ |
| (11) | $C_{13}H_{23}$ | p-$C_{12}H_{25}$ |
| (12) | $C_{11}H_{23}$ | p-$C_{14}H_{29}$ |
| (13) | $C_{13}H_{27}$ | p-$C_{13}H_{27}$ |
| (14) | $C_{12}H_{25}$ | p-$C_{14}H_{29}$ |
| (15) | $C_{14}H_{29}$ | p-$C_{13}H_{27}$ |

Example 4a

With reference to example 2a, an aromatic/hydrocarbon component of this invention can comprise compounds (1)–(15) of example 4 and be utilized as a mixture with about 14.5 wt. percent of a $C_8$–$C_{10}$ linear alkylbenzene. Such a mixture (ave. MW=376) having assigned a CAS registry number of 68988-79-4 is available from Vitech International Inc.

Example 4b

With reference to example 2b an aromatic/hydrocarbon component of this invention can comprise compounds (1)–(15) of example 4 and be utilized as a mixture with about 15.5 wt. percent of a $C_8$–$C_{10}$ linear alkylbenzene. Such a mixture (ave. MW=386) having assigned a CAS registry number of 68988-79-4 is available from Vitech International Inc.

Example 4c

With reference to example 2c an aromatic/hydrocarbon component of this invention can comprise compounds (1)–(15) of example 4 and be utilized as a mixture with about 14.4 wt. percent of a $C_8$–$C_{10}$ linear alkylbenzene. Such a mixture (ave. MW=410) having assigned a CAS registry number of 68988-79-4 is available from Vitech International Inc.

Example 5

With reference to structures I(c) of example 4, the aromatic/hydrocarbon components of this example are heavy alkylates of the type which can be incorporated, at the wt. percentage shown, as part of an active automobile spray wax composition.

| | $R_1$ | $R_2$ | % |
|---|---|---|---|
| (4) | H | o-$C_8H_{17}$ | 29 |
| (2) | H | p-$C_{10}H_{21}$ | 42 |
| (3) | H | o-$C_{15}H_{31}$ | 57 |
| (4) | H | p-$C_{20}H_{41}$ | 35 |
| (5) | $CH_3$ | p-$C_8H_{17}$ | 39 |
| (6) | $CH_3$ | o-$C_{10}H_{21}$ | 34 |
| (7) | $CH_3$ | p-$C_{18}H_{39}$ | 50 |
| (8) | $C_8H_{17}$ | o-$C_8H_{17}$ | 47 |
| (9) | $C_{12}H_{25}$ | o-$C_{13}H_{27}$ | 30 |
| (10) | $C_{12}H_{25}$ | p-$C_{14}H_{29}$ | 61 |
| (11) | $C_{17}H_{35}$ | p-$C_8H_{17}$ | 55 |
| (12) | $C_{18}H_{37}$ | p-$C_{15}H_{31}$ | 40 |

Example 5a

A mixture in accordance with Example 4a can be used, at about 30 to about 60 wt. percent, as part of an active spray wax composition.

Example 5b

A mixture in accordance with Example 4b can be used, at about 30 to about 60 wt. percent, as part of an active spray wax composition.

Example 5c

A mixture in accordance with Example 4c can be used, at about 30 to about 60 wt. percent, as part of an active spray wax composition.

Example 6

Depending on the particular end-use application, components of the type described in the previous example can be employed with one of a variety of emulsifying agents, including those described elsewhere herein. Such agents, depending on their chemical identity, are used in amounts sufficient to initiate and maintain homogeneity during mix, storage and/or use conditions. Generally, however and without limitation, an active automobile spray wax composition will be about 40 to about 55 wt percent emulsifier. With reference to Examples 5 and 5a–c, incorporation of an emulsifier is illustrated by the following.

(a) Component (1) and 39% emulsifier (cationic).
(b) Component (4) and 43% emulsifier (cationic).
(c) Component (6) and 42% emulsifier (non-ionic).
(d) Component (7) and 54% emulsifier (quaternary ammonium).
(e) Component (8) and 46% emulsifier (quaternary etheramine).
(f) Component (11) and 45% emulsifier (cationic).
(g) Component (12) and 51% emulsifier (non-ionic).
(h) Example 5a and 40% emulsifier (cationic).
(i) Example 5b and 43% emulsifier (cationic).
(j) Example 5c and 45% emulsifier (cationic).

Consistent with the scope of this invention each of combination (a)–(j) of this example can be used with a coupling solubilizer and/or solvent such as, but not limited to, various commercially-available amine oxides, and glycol ethers. Depending upon the identity of the solvent/solubilizer the amount present in an active automobile spray wax composition can be about 5 to about 20 wt. percent.

The following examples (7–13) illustrate use of the aromatic/hydrocarbon components of this invention, with other compatible components and diluted with water, as part of an automobile spray wax composition. In particular, these examples show that spray wax compositions exhibiting excellent performance properties can be prepared with active levels lower than possible using mineral seal oils of the prior art. A non-mineral oil spray wax is thus available at comparable or lower costs through use of this invention. Formulations represented by such examples test well for F/T, 120F and 10:1 dilution stability, all of which are parameters indicative of utility and performance and recognized by those skilled in the art.

| Component | Wt. % |
|---|---|
| Ar/H | 14.0 |
| Cationic Surfactant | 12.0 |
| Nonionic Surfactant | 1.0 |
| Glycol Ether | 1.0 |
| Water | 70.0 |

The composition of this example is formulated for use as a spray wax. An aromatic/hydrocarbon (Ar/H) component especially useful with this example is the mixture of example 4a. As with other such compositions of this invention, the components of this formulation can be initially added together with thorough mixing. Water is then added slowly, with additional mixing until clear. Suitable cationic and non-ionic surfactants are available commercially and will be known to those skilled in the art and made aware of this invention. Alternatively, a useful emulsifier is a di-fatty quaternary ammonium cationic-based blend, also available from Vitech International, Inc. under the ViQuat SWE trademark(s). Use of this component can lower the active level to about 17 wt. percent of a standard spray wax composition (as compared to a 20% active mineral seal oil composition required to achieve the same performance). With reference to a standard spray wax composition, such as that provided in this example, use of this blend will permit a more economical formulation (70% vs. 83% water) without compromising performance. Similar economies are available through similar modifications of the following examples.

Example 8

| Component | Wt. % |
|---|---|
| Ar/H | 10.0 |
| Cationic Surfactant | 10.0 |
| Glycol Ether | 3.0 |
| Water | 77.0 |

This example represents an economical formulation, as compared to Example 7, of a standard spray wax composition. The Ar/H component can be as referenced in Example 7; alternatively the mixture of Example 4a can be compositionally modified with respect to its linear and/or dialkylbenzene aspects, with any needed surfactant modification. Such an Ar/H mixture is also identifiable under the 68988-79-4 CAS registry number.

Example 9

| Component | Wt. % |
| --- | --- |
| Ar/H | 14.0 |
| Cationic Surfactant | 12.0 |
| Nonionic Surfactant | 1.0 |
| Fragrance | 1.0 |
| Glycol Ether | 3.0 |
| Water | 69.0 |

Using any Ar/H component of this invention, including those identified by the 68988-79-4 CAS registry number, a fragranced spray wax composition can be formulated as illustrated in this example. To prepare, the fragrance component should be mixed with the active components prior to the addition of water. A benefit of the present invention is that the Ar/H components described herein have little or no odor, as compared to mineral seal oil, such that fragrance levels can be reduced below those typically used. Fragrance components are commercially available, the choice of which may require some formula modification. It should also be noted, and as is applicable to other examples of this invention, while glycol ether is provided as the solvent/solubilizer, other components such as those described herein can be used with the necessary formula modification.

Example 10

| Component | Wt. % |
| --- | --- |
| Ar/H | 14.0 |
| Cationic Surfactant | 12.0 |
| Nonionic Surfactant | 1.0 |
| Foaming Agent | .50 |
| Glycol Ether | 3.0 |
| Water | 65.0 |

The formulation of this example can be used to provide a foaming spray wax. The foaming agent concentration can be adjusted depending upon properties desired. Various foaming agents are commercially available to provide a variety of foam qualities. An Ar/H component useful with such a composition is the mixture of Example 4b, or any modification thereof as would be identified by the 68988-79-4 CAS registry number. Other Ar/H components of this invention, including components (4), (9), (12) of Example 5 can also be used.

Example 11

| Component | Wt. % |
| --- | --- |
| Ar/H | 13.0 |
| Cationic Surfactant | 11.0 |
| Nonionic Surfactant | 1.0 |
| Glycol Ether | 3.0 |
| Silicone | 1.0 |
| Water | 71.0 |

The composition of this example is formulated as a silicone-modified spray wax. The Ar/H component thereof can comprise a blend of the mixtures of Examples 4a, 4b and 4c. The silicone component is incorporated to provide enhanced gloss and durability. It is preferably added to the other active components and mixed thoroughly, before slow addition of water. Various silicone components are commercially available, including one under the ViSil OMS designation from Vitech International, Inc.

Example 12

| Component | Wt. % |
| --- | --- |
| Ar/H | 10.0 |
| Cationic Surfactant | 10.0 |
| Glycol Ether | 3.0 |
| Silicone | 0.5 |
| Water | 76.5 |

The composition of this example represents a more economical silicone-modified spray wax formulation. As mentioned above, greater economies can be realized through use of the surfactant blend described in Example 7. Other useful Ar/H components and/or heavy alkylates include components (5) and (11) of Example 5.

Example 13

Split hood tests have been conducted comparing the utility of various inventive formulations vs traditional mineral seal oil formulations. Results on a variety of automobile surfaces indicate that the same or comparable performance can be achieved with formulations such as those described herein, using the inventive aromatic/hydrocarbon components at lower active levels compared to the mineral seal oil formulations of the prior art. A benefit is the availability of a non-mineral seal oil spray wax at lower or equal cost compared to higher active mineral seal oil formulations. For the purpose of illustration, consider the following.

| (a) | | | (b) | |
| --- | --- | --- | --- | --- |
| Component | Wt. % | vs | Component | Wt. % |
| Mineral Seal Oil | 20.0 | | Ar/H | 14.0 |
| Cationic Surfactant | 16.0 | | Cationic Surfactant | 12.0 |
| Glycol Ether | 3.0 | | Nonionic Surfactant | 1.0 |
| Water | 61.0 | | Glycol Ether | 3.0 |
| | | | Water | 70.0 |

The test procedure utilized is as follows:

1. The auto hood is washed with a mild detergent until there is no sign of beading/sheeting when water is applied.
2. The respective formulations are diluted 3 grams/1 gallon of water in a 1 gallon container.
3. The products are simultaneously applied to the hood surface: One product (a) on half the hood and one product (b) on the other half of the hood.
4. Quickness of water break and water removal is observed and recorded for each product.

The level of performance with the lower active formulation of this invention (b) is the same or comparable to a mineral seal oil-based system (a). The result is an outstanding environmental profile without a decrease in performance or increase in cost.

While the principles of this invention have been described in connection with specific embodiments, it should be understood clearly that these descriptions, along the chosen tables and data therein, are made only by way of example and are not intended to limit the scope of this invention, in any manner. Various other side streams from the production and/or distillation of linear alkylbenzenes, otherwise identified as alkyl derivative fractionation bottoms, distillation bottom ends and high boilers, can be used. Other advantages and features of this invention will become apparent from the following claims, with the scope thereof determined by the reasonable equivalents, as understood by those skilled in the art.

I claim:

1. An automobile spray wax composition, comprising:
   an aromatic hydrocarbon having at least one of two linear $C_8$–$C_{20}$ alkyl substituents; and
   an emulsifier.
2. The composition of claim 1 wherein said aromatic hydrocarbon is benzene.
3. The composition of claim 2 wherein said hydrocarbon is a mixture of mono- and di-substituted benzenes.
4. The composition of claim 3 wherein said hydrocarbon has a CAS registry number of 68988-79-4.
5. The composition of claim 3 wherein said di-substituted benzenes consist essentially of para-substituted benzenes.
6. The composition of claim 5 wherein said benzenes have substantially linear $C_{10}$–$C_{14}$ alkyl substituents.
7. The composition of claim 1 wherein said aromatic hydrocarbon is toluene.
8. The composition of claim 7 wherein said hydrocarbon is a mixture of mono- and di-substituted toluenes.
9. The composition of claim 1 wherein said emulsifier selected from the group consisting of cationic surfactants, nonionic surfactants, anionic surfactants, quaternary ammonium salts, ethoxylated amines and combinations thereof.
10. The composition of claim 9 wherein said emulsifier is a nonionic surfactant.
11. The composition of claim 1 further including a coupling solubilizer.
12. The composition of claim 11 wherein said solubilizer is a polyol ether.
13. The composition of claim 11 wherein said aromatic hydrocarbon is about 35 weight percent to about 65 weight percent of said composition.
14. The composition of claim 13 diluted with water.
15. An aqueous composition, comprising an organic component having the structural formula

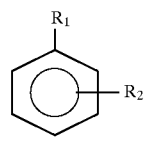

wherein $R_1$ is selected from the group consisting of hydrogen, methyl and a substantially linear $C_8$–$C_{20}$ alkyl substituent, and wherein $R_2$ is substantially linear $C_8$–$C_{20}$ alkyl substituent, and a water diluent component.
16. The composition of claim 15 wherein $R_1$ is a combination of hydrogen and said alkyl substituents, such that the organic component is a mixture of mono- and di-substituted benzenes.
17. The composition of claim 16 wherein $R_1$ and $R_2$ are substantially linear $C_{10}$–$C_{14}$ alkyl substituents.
18. The composition of claim 15 further including an emulsifier selected from the group consisting of cationic surfactants, nonionic surfactants, anionic surfactants, quaternary ammonium salts, ethoxylated amines and combinations thereof.
19. The composition of claim 15 further including a coupling solubilizer.
20. The composition of claim 15 wherein said organic component is about 35 weight percent to about 65 weight percent of said composition.
21. An aqueous composition of the type usable as a spray wax for automobiles and including an emulsifier, the improvement comprising a hydrophobic component selected from the group of heavy alkylates consisting of dialkyl benzenes and linear alkyl benzenes, said heavy alkylates having a CAS registry number of 68988-79-4.
22. A method of using an aromatic hydrocarbon to increase the surface tension of water applied to an automobile finish, said method comprising:
   providing an automobile finish wetted with water;
   providing an aromatic hydrocarbon composition comprising heavy alkylates; and
   applying said composition to said automobile finish.
23. The method of claim 22 wherein said heavy alkylates are a mixture of mono- and di-substituted benzenes.
24. The method of claim 23 wherein said hydrocarbon has a CAS registry number of 68988-79-4.
25. The method of claim 23 wherein said benzenes have substantially linear $C_{10}$–$C_{14}$ alkyl substituents.
26. The method of claim 22 wherein said heavy alkylates are about 35 weight percent to about 65 weight percent of said aromatic hydrocarbon composition.
27. The method of claim 26 wherein said aromatic hydrocarbon composition is diluted with water.

* * * * *